United States Patent
Wiles et al.

(10) Patent No.: US 6,738,829 B1
(45) Date of Patent: May 18, 2004

(54) SYSTEM AND METHOD FOR IMPLEMENTING A GENERIC ENHANCED NETWORK DRIVER

(75) Inventors: Roger Wiles, Corinth, TX (US); Timothy Michals, Coppell, TX (US)

(73) Assignee: Wind River Systems, Inc., Alameda, CA (US)

(*) Notice: Subject to any disclaimer, the term of this patent is extended or adjusted under 35 U.S.C. 154(b) by 421 days.

(21) Appl. No.: 09/688,570

(22) Filed: Oct. 16, 2000

(51) Int. Cl.[7] ............................................. G06F 13/10
(52) U.S. Cl. ..................................................... 709/321
(58) Field of Search ........................................ 709/321

(56) References Cited

U.S. PATENT DOCUMENTS

| | | | |
|---|---|---|---|
| 5,831,969 A | * 11/1998 | Bales et al. | 370/225 |
| 5,883,804 A | * 3/1999 | Christensen | 700/94 |
| 6,101,188 A | * 8/2000 | Sekine et al. | 370/401 |
| 6,112,246 A | * 8/2000 | Horbal et al. | 709/230 |
| 6,141,705 A | * 10/2000 | Anand et al. | 710/15 |
| 6,233,624 B1 | * 5/2001 | Hyder et al. | 709/327 |
| 6,253,255 B1 | * 6/2001 | Hyder et al. | 709/321 |

OTHER PUBLICATIONS

Brad Turner, Exposing the deep, dark secrets of TCP/IP, Feb. 1, 1999.*
Richard Stevens, Unix Network Programming, 1990, Prentice Hall, section 1.5, section. 5.3.4.*
Wind River Systems, Inc., Network Protocol Toolkit User's Guide, Edition 3, Apr. 21, 2000.

* cited by examiner

Primary Examiner—Thomas Lee
Assistant Examiner—LeChi Truong
(74) Attorney, Agent, or Firm—Fay Kaplun & Marcin, LLP

(57) ABSTRACT

A software package for operating on a network including a plurality of network hardware devices comprises at least one networking protocols to transmit and receive data packets over the network, a hardware device driver coupled to the network hardware devices, an enhanced network driver coupled to the hardware device driver to transmit and receive the data packets using the network hardware devices and a control interface to transmit and receive control information to and from the hardware device driver. The enhanced network driver and control interface being portable to multiple network hardware devices.

32 Claims, 10 Drawing Sheets

| PORT | ADDRESSES |
|---|---|
| 111 | A(15) |
| 131 | B(35); C(36) |
| 151 | D(55); E(56); F(57) |
| 121 | G(25); H(26) |
| 141 | 1(45); J(46); K(47) |
| 161 | L(65); M(66) |

F I G. 2

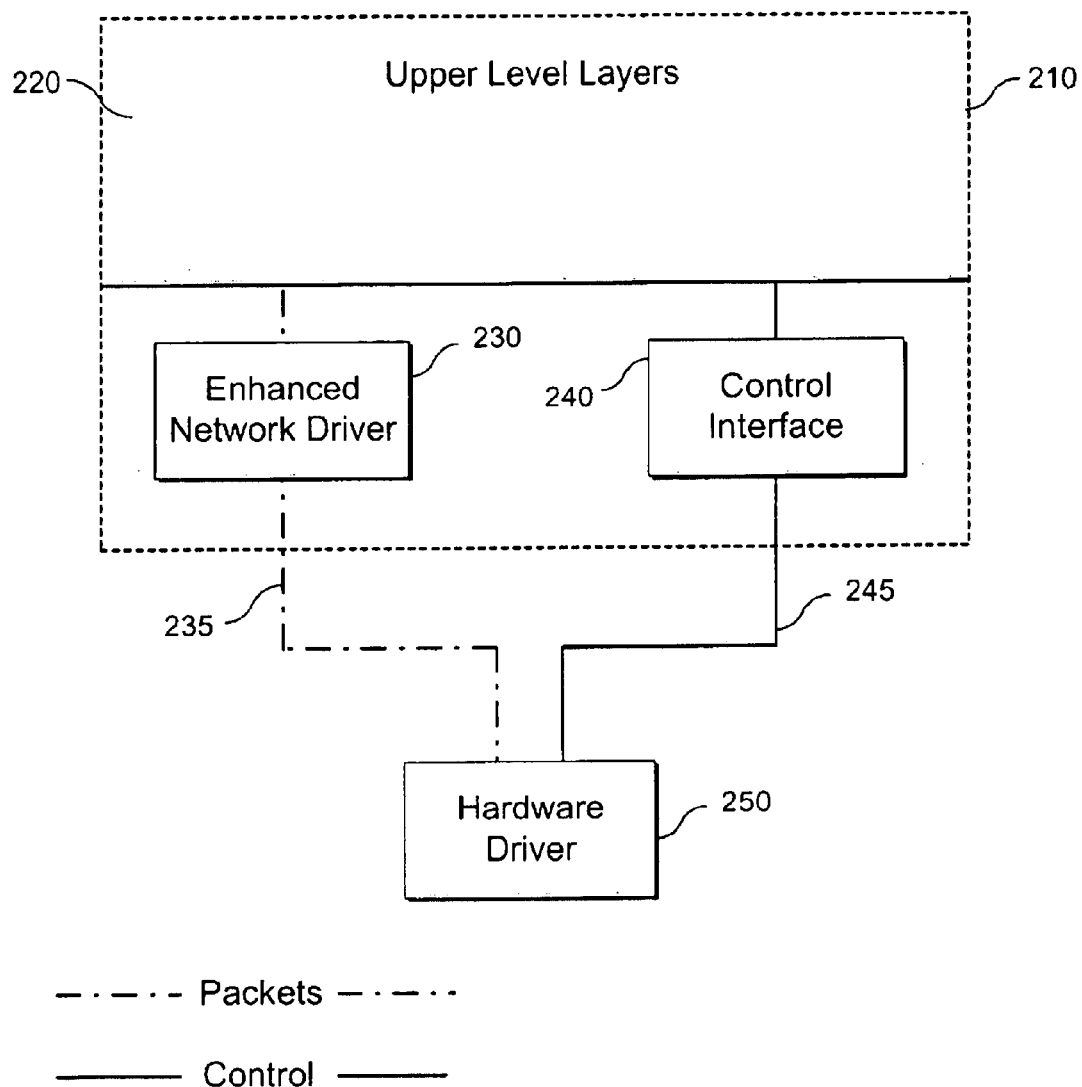
F I G. 3

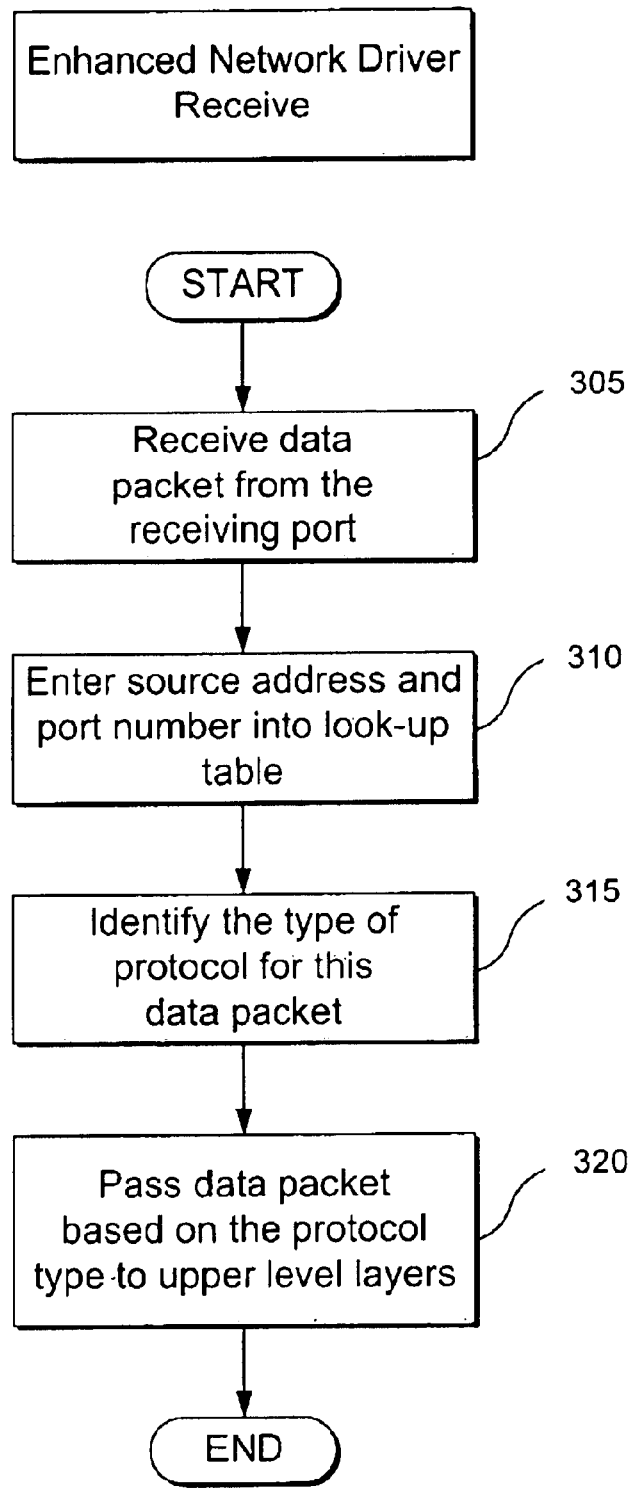
F I G. 5a

SYSTEM AND METHOD FOR IMPLEMENTING A GENERIC ENHANCED NETWORK DRIVER

BACKGROUND INFORMATION

A computer network is simply a group of two or more computers that are linked together. Many types of networks exist, but the most common types of networks are Local-Area Networks (LANs) and Wide-Area Networks (WANs). In a LAN computers are connected within a "local" area, for example, a home or office. A LAN in a home or small office may interconnect a few computers, whereas in the case of a large office or industrial complex, the LAN may include hundreds or even thousands of interconnected computers. In a WAN, the interconnected computers are generally farther apart and are connected via telephone/communication lines, radio waves, or other means of communication. There are also other network devices, for example, bridges, routers and switches, which may be used to link different networks or network segments into a larger network with more resources.

Each of these networks and network segments may have a peer-to-peer arrangement where each computing device is interconnected with the others on the network, or in a client/server arrangement where individual personal computers (PCs) log onto a server device. Additionally, a network is not limited to computers, but may also include other types of hardware devices and information services, for example, the bridges, routers and switches described above, printers, copiers and shared Internet connections. A network allows each of the users to interconnect with the other devices and services on the network for purposes such as application and file sharing, printer access, electronic mail and Internet access.

In a heterogeneous environment, such as a computer network, it is essential that each of the interconnected devices be able to receive information from and transmit information to the other devices in the network. The information transferred between network devices is generally referred to as data packets or packets and this transfer of information is generally referred to as packet flow. In response to the need for the different devices to communicate, standards bodies and other entities have developed numerous protocols for data packet flow over a network. A protocol specifies a common set of rules for packet format and packet flow, allowing a variety of devices to communicate. A layering model is the most common manner of dividing a protocol into subparts. The idea behind layering is that each layer is responsible for providing a service to the layer above by using the services of the layer below. Each layer communicates with its peer layer in another network node through the use of the protocol.

Generally, a data packet contains a destination address that is associated with one or more of the network devices. As the data packet travels through the network, the network routing devices are able to route the data packet to the correct destination or destinations based on the address. A network driver is an important piece of software because it is the interface between the network software and a hardware device. The network driver allows the upper level layers to interface with the hardware devices for control purposes, for example, the setting of registers in the hardware device, and also contains addressing interfaces information which allows the data packets to be transmitted to the hardware device.

However, since the network driver contains information for control of a particular hardware device, it is not transportable to other devices. Every network device needs an individual network driver configured for that particular hardware device. Additionally, the individual developing software code for the network driver needs intimate knowledge of both the hardware device and the network software. Thus, a hardware device manufacturer developing a network driver that is specific to its particular hardware device has, as an added level of complication, the need to understand the network software for any type of network in which the hardware device may be connected. In contrast, network software developers understand the network software, but are not intimately familiar with all the features of various hardware devices which may be connected to the network.

SUMMARY OF THE INVENTION

The present invention is directed to a software package for operating on a network including a plurality of network hardware devices. The software package includes at least one networking protocol to transmit and receive data packets over the network. The software package further includes a hardware device driver communicatively coupled to the network hardware devices, an enhanced network driver communicatively coupled to the hardware device driver to transmit and receive the data packets using the network hardware devices and a control interface to transmit and receive control information to and from the hardware device driver. The enhanced network driver and the control interface being portable to all of the network hardware devices, without regard for the type of the network hardware device.

BRIEF DESCRIPTION OF DRAWINGS

FIG. 2 shows an exemplary look-up table according to the present invention.

FIG. 3 shows a block diagram of an exemplary embodiment of an enhanced network driver according to the present invention.

FIG. 5a shows an exemplary control process for the receipt processing of a data packet by an enhanced network driver according to the present invention.

DETAILED DESCRIPTION

Figure 1:
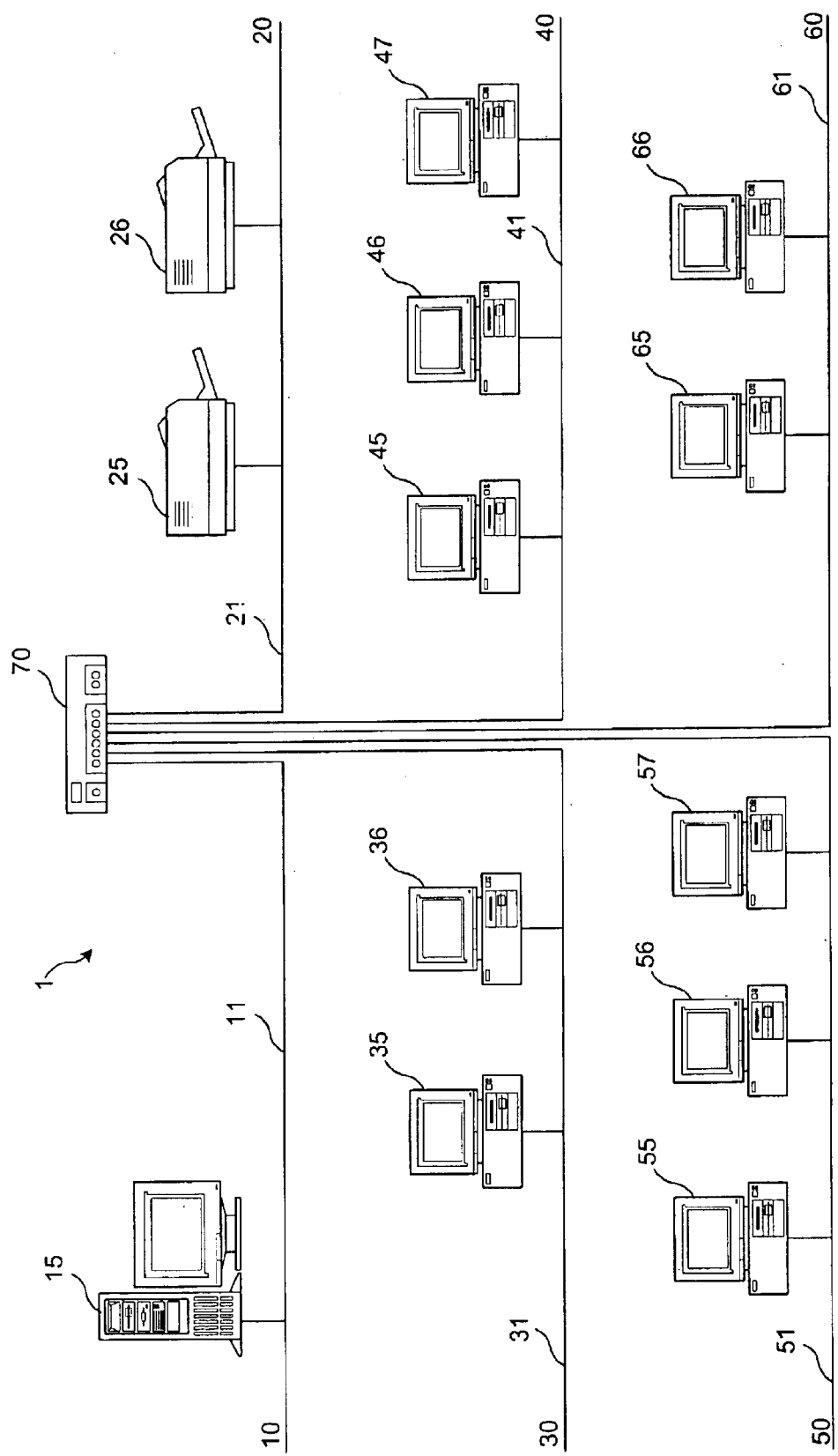
FIG. 1 shows an exemplary network on which the present invention may be implemented.

The present invention may be further understood with reference to the following description and the appended drawings, wherein like elements are provided with the same reference numerals. Initially referring to FIG. 1 there is illustrated an exemplary network 1 on which the present invention may be implemented. Network 1 includes six network segments 10–60 each of which has a network bus 11–61 to which various network devices are connected. Network segment 10 has server 15 connected to bus 11. Network segment 20 has printers 25–26 connected to bus 21. Network segment 30 has personal computers (PCs) 35–36 connected to bus 31. Similarly, network segments 40–60 have PCs connected to their buses. In the exemplary network 1 of FIG. 1, all of network segments 10–60 are linked via ports of network switch 70 allowing all the network hardware devices to interconnect with any other hardware device on any of network segments 10–60. Those skilled in the art will understand that network 1 is only exemplary and that the present invention may be applied to any network topology, for example, star, bus, ring, etc. and is also not limited by the number or type of hardware devices on the network. For example, the present invention may be implemented on a network comprising only one of the network segments described above or it may be implemented on a network having multiple switches, bridges and routers which allow the network to have hundreds or thousands of connected hardware devices.

When network 1 is physically connected, the various network hardware devices can begin sending data packets to other network hardware devices. As described above, this communication is controlled via a protocol which specifies a common set of rules for packet format and packet flow. This protocol is implemented via the network software which is resident on various network hosts which may include the connected hardware devices. The network software controls the packet flow through the network. Throughout this specification the terms network software and protocol may be used interchangeably to describe the implementation of this common set of rules for packet format and packet flow and also for network applications such as STP (Spanning Tree Protocol) and SNMP (Simple Network Management Protocol). STP prevents loops in switched networks and SNMP allows network devices such as switches and routers to be configured and monitored by any host on the LAN.

One common protocol is the TCP/IP (Transmission Control Protocol/Internet Protocol) protocol suite. The TCP/IP protocol suite includes many different protocols, including SMTP (Simple Mail Transfer Protocol) and FTP (File Transfer Protocol). In general, TCP handles packet flow between devices and systems and IP handles the addressing of packets. In a network that uses IP, the network devices are identified by unique numbers which are known as IP addresses. These IP addresses allow the data packets to be routed or switched to the correct devices. Those skilled in the art will understand that the present invention is not limited to any particular type of network software or protocol and may be applied to any networking protocol.

For example, PC 56 on network segment 50 may receive a request for a data packet from PC 57 which is also on network segment 50. Each of PCs 56 and 57 will have a unique address and therefore PC 56 will know where to send the data packet. This destination address will be added to or encoded on the data packet and then the network software will send the data packet to the correct destination, in this case PC 57. Those skilled in the art will understand that different network protocols perform addressing in different manners and that data packets may be encoded with more information than the destination address, for example, the source address, protocol type, etc. The present invention may be implemented on any network regardless of the manner of addressing or encoding of the data packets.

Another example of network software sending data packets through the network may be when PC 56 requests a web page for display on its screen. PC 56 may have, for example, a web browser that generates a request for a particular web page. The request is in the form of a data packet or packets that have the ultimate destination of a web server, which, in the case of network 1 is resident on switch 70. The data packet request is encoded by the network software including the destination address of switch 70 and then the data packet is sent out on bus 51. Switch 70 receives the data packet and the network software passes the data packet request to the web server. The web server processes the requests and sends the requested web page, in the form of data packets, out the correct port of switch 70 back to PC 56, which may then display the web page. The flow of the data packets within the network software will be described in greater detail below.

One manner in which switch 70 may determine which of its ports a data packet should be sent out on is through the use of a look-up table that contains specific addressing information. For example, the look-up table of switch 70 may store various destination addresses, including the destination addresses for PC 47 and PC 56. These destination addresses may be linked to the corresponding port numbers of switch 70. Therefore, when switch 70 transmits a data packet to a destination address, it accesses the look-up table to determine the transmission port corresponding to the destination address. The addresses in the look-up table may be programmed into switch 70, or after a series of data packet transmissions, switch 70 may learn the addresses and create or fill-in the look-up table on its own. This process will be described in more detail below.

FIG. 2 shows exemplary look-up table 100 that may be implemented in switch 70 according to the present invention. Look-up table 100 has two columns, port column 101 corresponding to port numbers of switch 70 and addresses column 102 corresponding to the addresses of the hardware devices connected to the port. In exemplary look-up table 100, the hardware addresses have been simplified to be a single letter followed by a number in parenthesis where the number corresponds to the number of the hardware device in FIG. 1. For example, server 15 of FIG. 1, is connected to port 111 of switch 70 and has an address of A(15). Similarly, PC 56 is connected to port 151 of switch 70 and has an address of E(56). Thus, in the example above, when switch 70 transmits the data packets for display of the web page to PC 56, switch 70 determined through look-up table 100 that the destination address on the data packet corresponded to port 151. The data packet was then transmitted via port 151 of switch 70 to PC 56. Those skilled in the art will understand that the addresses in look-up table 100 are only exemplary and that different protocols may have different manners of assigning addresses and also that a look-up table may contain much more information than illustrated in look-up table 100 of FIG. 2.

As described above, a layering model is the most common manner of dividing or separating a protocol into functional units. The theory behind layering is that each layer is responsible for providing a service to the layer above by using the services of the layer below. Each layer communicates with its peer layer in another network node (or device) through the use of the protocol. When a layer wishes to transfer information in a data packet to its peer layer in another network node, the layer adds (or encapsulates) that information to the data packet and passes the data packet to the layer below. This lower layer may also encapsulate additional information on the data packet that it is transmitting to its peer layer in the other network node. This continues down through the layers until the data packet reaches the lowest layer, which actually passes the data packet to the lowest layer of the other network node. When the other network node receives the data packet, each layer strips away (or de-encapsulates) the information from the data packet that was sent by its peer layer and passes the remaining data up to the next layer. In this manner each layer receives the information from its peer layer.

FIG. 3 illustrates a block diagram of an exemplary embodiment of the present invention. FIG. 3 shows network software 210 which includes upper level layers and applications 220, Enhanced Network Driver 230 and Control Interface 240. Hardware device driver 250 is shown as being functionally outside network software 210 in FIG. 3. However, those skilled in the art will understand that hardware device driver 250 may be functionally contained inside or outside of network software 210. There are no specific upper level layers and applications shown in FIG. 3, but those skilled in the art will understand that they may include such protocols as TCP, IP, UDP (User Datagram Protocol), SNMP, STP, FTP, etc. The specific network hardware device employing network software 210 is not shown in FIG. 3, because those skilled in the art will understand that the present invention may be applied to any network hardware device.

Network software 210 and hardware device driver 250 manage the network hardware device. As described previously, this management includes both control of the hardware device and the handling of the data packets addressed to the hardware device. The exemplary embodiment of the present invention illustrated in FIG. 3 allows the separation of these two functions, i.e., hardware control and data packet handling. Hardware control is accomplished through control interface 240 as shown by the solid line 245 in FIG. 3 and data packet handling and addressing is accomplished through enhanced network driver 230 as shown by the phantom line 235 in FIG. 3. Each of these elements will be described in greater detail below. This separation allows enhanced network driver 230 to provide a generic packet interface between the underlying hardware interfaces, for example, hardware device driver 250, and upper level layers 220 of network software 210. Since enhanced network driver 230 is generic and does not control any hardware, it is not tied to any particular hardware, and is therefore transportable to any hardware device which may be included in the network.

In FIG. 3, hardware device driver 250 provides the interface between network software 210 and the physical network hardware device. Hardware device driver 250 may be considered the lowest level layer in the protocol. Generally, hardware device driver 250 provides services such as the initialization of hardware and hardware support tasks, hardware management and data packet transfer. However, the specific tasks accomplished by hardware device driver 250 are highly dependent on the underlying network hardware device. For example, when initializing a hardware device, hardware device driver 250 may set hardware control registers or support hardware interrupts and vectors. As a further example, in the case of network switches, hardware device driver 250 may be responsible for switch and port statistic retrieval and management.

Hardware device driver 250 also provides support routines for sending and receiving data packets. However, hardware device driver 250 is only responsible for the physical transfer of the data packets. Enhanced network driver 230 is responsible for providing the common routines for addressing of the data packets, for example, inserting the source address and looking up the destination address. Since hardware device driver 250 is not responsible for data packet addressing, it does not need to include addressing functions for interface with upper level layers 220. For example, even when included in a network implementing the TCP/IP protocol as described above, hardware device driver 250 does not need to include functions for an IP network interface. Therefore, the developer of hardware device driver 250 does not need to understand how to interface with the various network layers and the manufacturer of the hardware device may develop hardware device driver 250 to address the specific capabilities of the hardware device without regard to the specific network software 210 which may be run on a given network to which the hardware device may be connected. In FIG. 3, hardware device driver 250 is shown outside network software 210 because this embodiment of the present invention allows hardware device driver 250 to be more closely related to the hardware device and to operate independently of the network software 210. However, those skilled in the art will understand that the present invention may also be implemented using one or more generic hardware device drivers incorporated within the network software for certain devices in addition to such separate hardware device drivers for other hardware devices. There is no requirement that each network hardware device have an independently designed hardware device driver.

Enhanced network driver 230 makes the connection between upper level layers 220 of network software 210 and the low level layer hardware device driver 250. Enhance network driver 230 is not designed with an understanding of specific network hardware devices and does not directly touch any hardware. This allows enhanced network driver 230 to function as a generic interface that handles the addressing of data packets without regard to the specific hardware device it is servicing.

Figure 4:
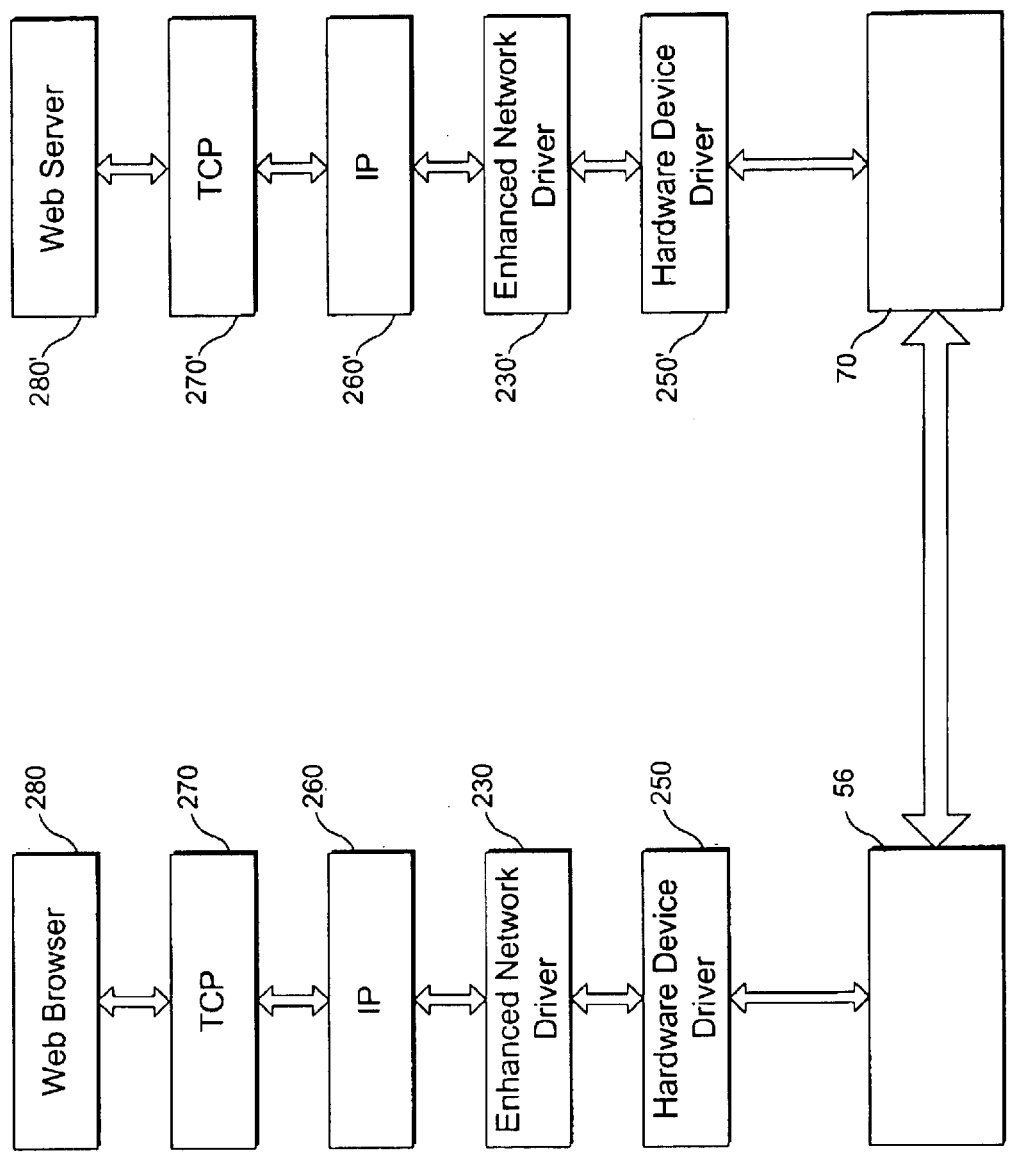
FIG. 4 shows a block diagram of an exemplary data packet transfer between network devices according to the present invention.

FIG. 4 shows a block diagram of an exemplary data packet transfer between network devices according to the present invention. The exemplary data packet transfer illustrated in FIG. 4 corresponds to the example described above where PC 56 is requesting a web page for display on its screen. In FIG. 4, exemplary network software layers are shown incorporating exemplary embodiments of the present invention using the TCP/IP protocol to transfer the data packets between network devices. PC 56 is shown having five protocol layers, where layer 250 is the hardware device driver, layer 230 is the enhanced network driver, layer 260 is the IP layer, layer 270 is the TCP layer and layer 280 is the web browser application. Similarly, switch 70 has five protocol layers, where layer 250' is the hardware device driver, layer 230' is the enhanced network driver, layer 260' is the IP layer, layer 270' is the TCP layer and layer 280' is the web server application. Those skilled in the art will understand that different protocols may have different numbers of layers and the five layers shown in FIG. 4 are only exemplary. When the user of PC 56 desires to view a particular web page, web browser 280 formats a series of data packets that represent this request. The data packet is then passed to TCP layer 270 which encapsulates the information in the data packet added by web browser 280 and adds additional TCP layer 270 information, for example sequence numbers and checksums. The data packet is then passed to IP layer 260 which encapsulates all the information passed down from TCP layer 270 and adds additional IP layer 260 information, for example the destination IP address. The data packet is then passed down to enhanced network driver layer 230 which, once again, encapsulates the information passed down from IP layer 260. As described above, enhanced network driver layer 230 may add, for example, the source address in the format of a Medium Access Control (MAC) address. Additionally, enhanced network driver layer 230 may perform a look up of the destination MAC address. The data packet is then passed to hardware device driver layer 250 which passes the data packet to the hardware device for physical transmission.

When switch 70 receives the data packet, it is initially passed up to hardware device driver layer 250' which de-encapsulates the data added by its peer layer in PC 56, hardware device driver layer 250', and passes the remaining data up to enhanced network driver layer 230'. Similarly, each of the layers de-encapsulates the information added by its peer layer in PC 56 until the data packet request arrives at web server application layer 280' which processes the request. Upon processing the request, web server application layer 280' may determine, for example, that a web page should be transmitted to PC 56. Web server application layer 280' may initiate a series of data packets that represent the web page, for example, a HTML (Hyper-Text Markup Language) page. The data packets are then passed to TCP layer 270' which encapsulates the information in the data packet added by web server application 280' and adds additional TCP layer 270' information. The data packet continues down the layers as more data is encapsulated at each of the layers until it arrives at switch 70 hardware for physical transmission. When PC 56 receives the data packets they are de-encapsulated by each layer, as described above, and arrive at web browser 280 which processes the data packet and prepares the page for display on the screen of PC 56.

In the above example, when switch 70 received the data packet from PC 56, enhanced network driver layer 230' upon receipt of the data packet may determine the port identification and source address of the data packet. The port identification is the port on switch 70 that received the data packet and the source address is the address for PC 56 that may be, for example, in the format of a MAC address. In this manner, enhanced network driver layer 230' may learn which of the ports of switch 70 are related to the address for PC 56. Enhanced network driver layer 230' may enter this information in, for example, a look-up table as described with respect to FIG. 2. When enhanced network driver layer 230', later sees the same address as a destination, it may access this addressing information in the look-up table so that it can direct the data packet to the correct port of switch 70. The upper level layers, for example IP layer 260', do not need to understand port numbers of switch 70 because the upper level layers are abstracted from the hardware device.

FIG. 5a shows an exemplary control process for the receipt processing, according to the present invention, of data packets by an enhanced network driver 230 of a switch, for example switch 70 of FIG. 1. In step 305, the enhanced network driver 230 receives the data packet from the receiving port through the lower level layer, for example, the hardware device driver 250. The process then continues to step 310 where the enhanced network driver 230 enters the source address and port number into, for example, a look-up table. As described above, enhanced network driver 230 uses this source address and port information when it is transmitting data packets out of switch 70. By extracting this addressing information, enhanced network driver 230 has now learned the port on which the source address resides. Therefore, if the network device that is the source of this particular data packet becomes a destination for a different data packet at a later time, enhanced network driver 230 has the port information for that destination address. In step 315, enhanced network driver 230 identifies the type and protocol of the data packet. The process then continues to step 320 wherein enhanced network driver 230 passes the data packet to the upper level layers based on the protocol type determined in step 315. For example, if enhanced network driver 230 determines that the data packet is based on the IP protocol, it will pass the data packet to the upper level IP layer.

Figure 5B:
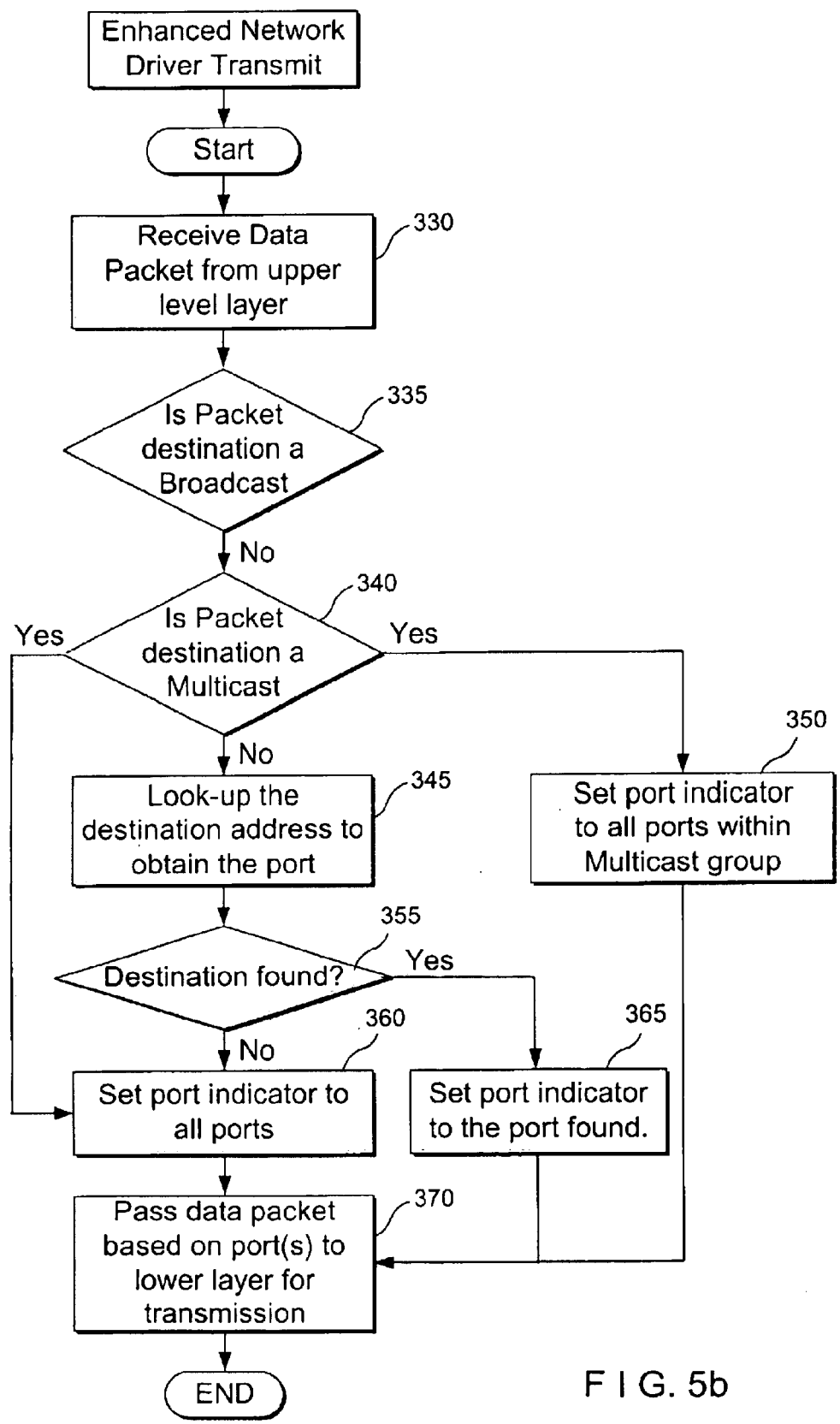
FIG. 5b shows an exemplary control process for the transmission processing of a data packet by an enhanced network driver according to the present invention.

FIG. 5b shows an exemplary control process for the transmission processing of the data packet by the enhanced network driver 230 of a switch, for example switch 70 of FIG. 1, according to the present invention. In step 330, enhanced network driver 230 receives the data packet from upper level layers 220. The process then continues to step 335 to determine whether the destination of the data packet is a broadcast. A broadcast destination means that the data packet should be sent out all ports of switch 70. If the destination address is not a broadcast, the process proceeds to step 340 where enhanced network driver 230 determines whether the destination of the data packet is a multicast. A multicast destination means that the data packet is destined for ports belonging to a particular multicast group. The multicast group may, for example, include all of the ports of switch 70, which would mean that the multicast address is essentially the same as a broadcast address. However, the multicast group may also, for example, contain zero, one, or more ports of switch 70. If it was determined in steps 335 and 340 that the packet was neither a broadcast or a multicast, then the data packet is a unicast which means that it destined for a single address out a single port of switch 70. In this case, the process continues to step 345, where enhanced network driver 230 looks up the destination address in, for example, the look up table, to determine the port number on which the data packet should be transmitted. If the destination address is found in step 355, the process continues to step 365 where the port indicator is set to the port number associated with the destination address. The process then continues to step 370 where enhanced network driver 230 passes the data packet with the correct port information to the lower level layer, for example, hardware device driver 250, for transmission.

If it was determined that the data packet was addressed for a multicast in step 340, the process would continue to step 350 where the port indicator is set to all ports within the multicast group, which as described above, may be any number of the ports of switch 70. The process then continues to step 370 where enhanced network driver 230 passes the data packet with the correct port information to the lower level layer for transmission. If it was determined that the data packet was addressed for a broadcast in step 335 or that the destination address was not found in step 355, the process continues to step 360 where the port indicator is set to all ports. In the case of a broadcast data packet, the port indicator is set to all ports because the data packet is destined for all ports. In the case of unicast data packet, enhanced network driver 230 does not know which port the data packet is destined for, so it is sent out of all ports so that it is guaranteed to arrive at the correct destination. After the port indicator is set to all ports in step 360, the continues to step 370 where enhanced network driver 230 passes the data packet addressed for transmission out of all ports. Those skilled in the art will understand that the above example control process included the elements of broadcast and multicast, which are normally associated with an Ethernet-type network. However, the present invention is not limited to Ethernet-type networks, but may be implemented on other network types. For example, a point to point network connection may not include broadcasting and multicasting, but the enhanced network driver may still be implemented in such a networking arrangement.

As can be seen from the above described example, enhanced network driver 230 is concerned with the addressing of data packets and the transmission of data packets to the next highest or next lowest layer in the protocol. The functions of the enhanced network driver 230 are completely independent of the hardware devices and contains no control functions for such devices. Therefore, enhanced network driver 230 is completely transportable within the network and may be implemented with any type of hardware device.

As described above with reference to FIG. 3, network software 210 not only functions to transmit and receive data packets, it also controls the hardware devices. As part of this control, upper level layers and applications 220 (as described previously, upper level layers 220 is used generically to describe upper level layers of a protocol, for example IP, TCP, UDP and also upper level applications such as STP, SNMP and web browser and server applications) may receive information on the status of the hardware device and/or change settings of the hardware device. For example, upper level layers 220 may receive information on the status of the hardware registers or may change the value of a hardware register. Similarly, when the hardware device is a network switch, upper level layers 220 may have access to the switch statistical information or control port status. Since enhanced network driver 230 is not involved in hardware control and hardware device driver 250 cannot directly interface with upper level layers 220, control interface 240 is interposed between upper level layers 220 and hardware device driver 250. Control interface 240 is an abstraction layer which allows upper level layers 220 to communicate control information to the hardware devices through hardware device driver 250. Unlike enhanced network driver 230, control interface 240 does not provide a network packet interface, but is used solely for control purposes.

Figure 6:
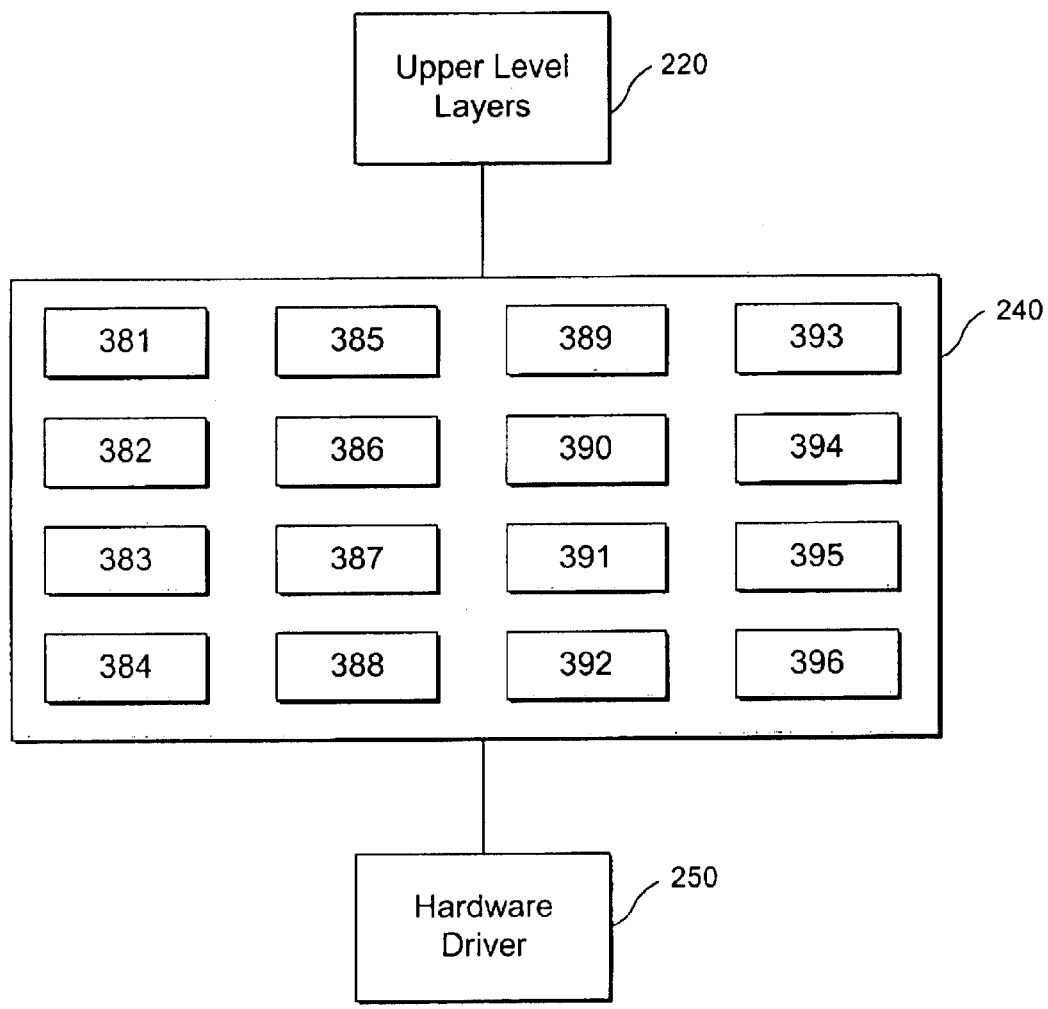
FIG. 6 shows a block diagram of an exemplary embodiment of an application program interface according to the present invention.

FIG. 6 illustrates a more detailed view of an exemplary embodiment of control interface 240 according to the present invention. As previously illustrated in FIG. 3, control interface is interposed between upper level layers 220 and hardware device driver 250. Control interface 240 contains object definitions 381–396. Each of object definitions 381–396 contains information about a hardware device or group of hardware devices, where the hardware device characteristics, for example enable and disable of a port, are referred to as objects. Those skilled in the art will understand the at the use of 16 object definitions are only exemplary and that object definitions 381–396 may be standard Management Information Base (MIBs) object definitions as defined by protocol Request for Comments (RFCs) or they may be other user defined object definitions as defined, for example, in an enterprise MIB. The MIBs may be, for example, those defined in RFC 1213 (Management Information Base for Network Management of TCP/IP-based internets: MIB-II) RFC 1493 (Definitions of Managed Objects for Bridges), RFC 1515 (Definitions of Managed Objects for IEEE 802.3 Medium Attachment Units), or RFC 1757 (Remote Network Monitoring Management Information Base).

The information stored in object definitions 381–396 is defined in a generic manner, for example, according to the standard or enterprise MIB object definitions. Thus, a limited number of object definitions may be able to include information about numerous hardware devices. Similar to enhanced network driver 230, control interface 240 is device-independent and fully transportable between network hardware devices because these limited number of object definitions include all of the information required in regard to any class of network device. There may be some instances in which the existing standard or enterprise object definition does not include the required information about a particular hardware device, but in these cases the structure for the object definitions follows defined standards so that the system developer can easily transfer the required information into a new object definition that a hardware device driver developer can support as required.

As part of an initial setup or during runtime operation, control interface 240 determines the objects (network devices) for which it will act as an interface. Control interface 240 then knows the correct object definitions to access when it needs to interface with a particular hardware device. When upper level layers 220 send a request for hardware information, for example, the state of a particular register, this request is processed through control interface 240. When the request is received by control interface 240, it accesses the correct object definition so that it can communicate the request to hardware device driver 250 which checks the status of the register and transfers the information back to control interface 240. This information is recorded in the object definition for communication back to upper level layers 220. Likewise, other control information may be retrieved or sent from upper level layers 220 to a particular hardware device through control interface 240.

Figure 7:
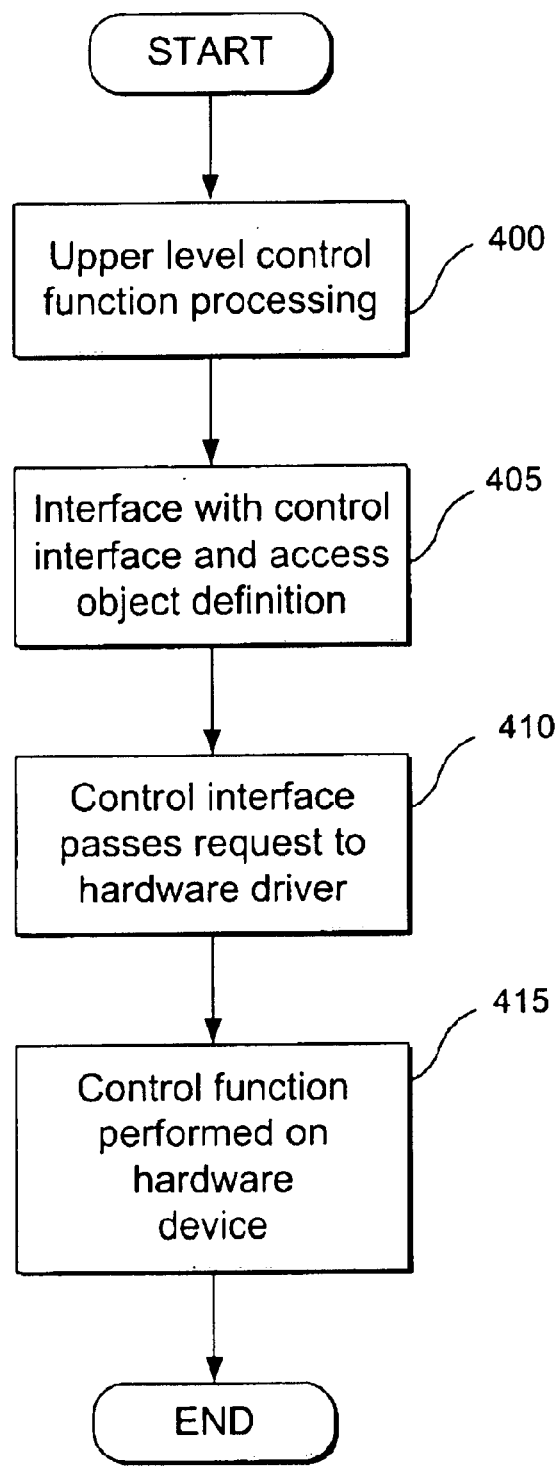
FIG. 7 shows an exemplary process for control of a network device according to the present invention.

FIG. 7 shows an exemplary process for control of a network device using an control interface according to the present invention. In step 400, the upper level layers 220 determine that a control function should be carried out on a particular hardware device. Control functions including, for example, the setting of hardware registers or the querying of a switch device for switch statistics. In step 405, the upper level layers 220 send the control request to the control interface 240 which accesses the specific object definition corresponding to the selected hardware device. As described above, during the initial setup of control interface 240 or during runtime operation, it determines the correct object definition to use for the network hardware device it will be servicing. This setup may be manual by the individual building the network or the control, the control interface 240 may query each of the hardware devices to determine the correct object definitions corresponding to the various network devices. The process then continues to step 410, where, through the use of the object definition, the control interface 240 passes the request to the device hardware device driver 250 which performs the requested control function on the hardware device in step 415. If the hardware device needs to communicate information back to the upper level layers 220, for example, the state of a register or some switching statistics, the process is carried out in the reverse order. But, in either case, the control interface 240 provides the necessary communication interface between the hardware device driver 250 and the upper level layers 220.

Figure 8:
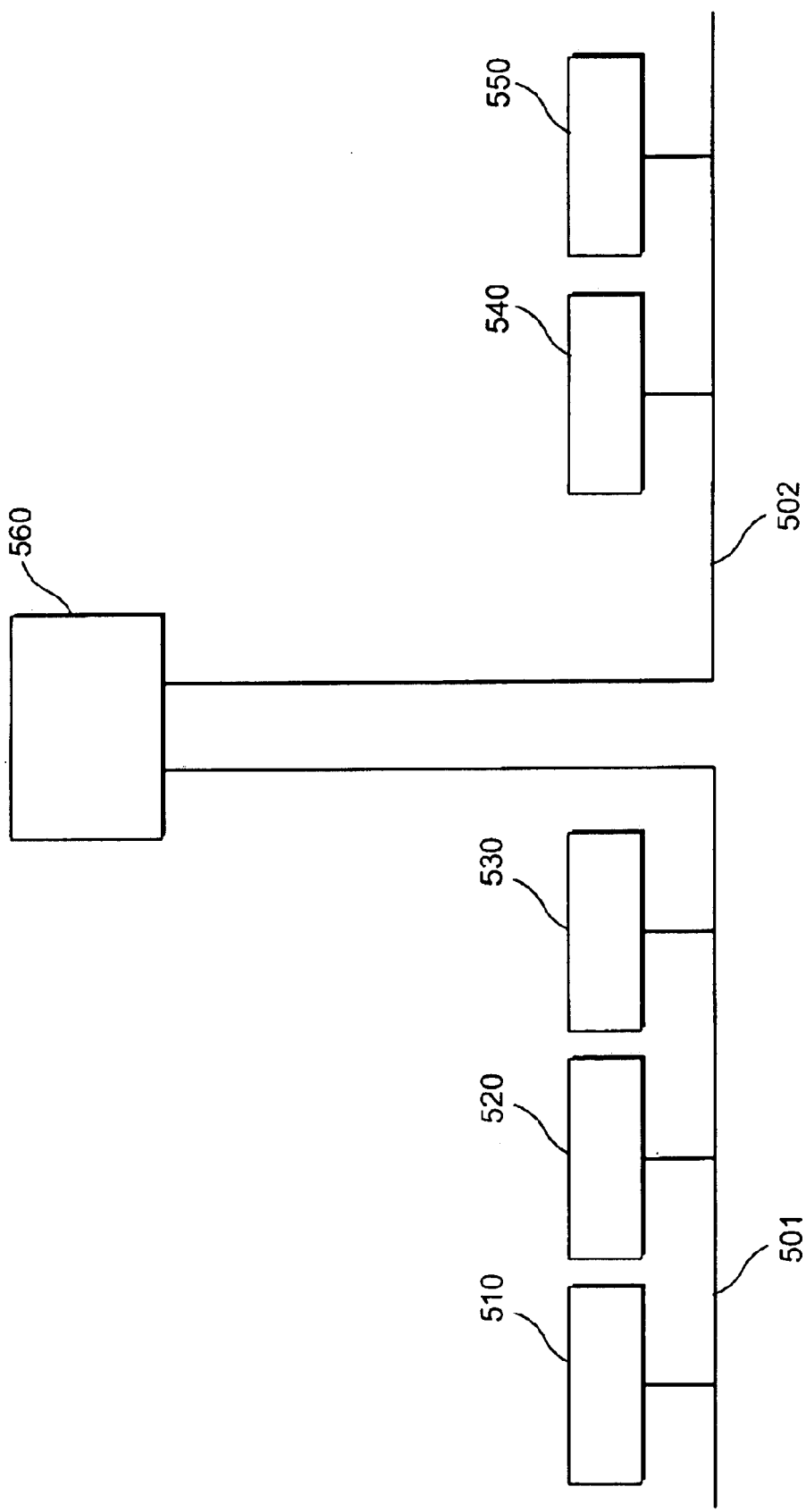
FIG. 8 shows a block diagram of an exemplary network according to the present invention.

FIG. 8 shows a block diagram of an exemplary network 500 according to the present invention. In FIG. 8 there are two Ethernet LANs 501 and 502 that are connected via router 560. Network hardware devices 510–530 are connected to Ethernet LAN 501 and network hardware devices 540–550 are connected to Ethernet LAN 502. Router 560 allows network hardware devices 510–530 to communicate with network hardware devices 540–550. Those skilled in the art will understand that network hardware devices 510–550 may be any type of hardware device that can be connected to a network including, for example, a PC, a printer, an internet appliance, any devices capable of accepting a network interface card (NIC), etc.

An example of data packet transfer in network 500 may be when network hardware device 510 on Ethernet LAN 501 wishes to transmit a data packet to network hardware device 550 on Ethernet LAN 502. If Ethernet LANs 501 and 502 implement the TCP/IP protocol suite, the data packet will be addressed with an IP address. The network software of network hardware device 510 should recognize that the IP address of network hardware device 550 is not contained in the same LAN, and therefore the data packet should be passed to router 560. Network hardware device 510 will encode both the destination IP address (for network hardware device 550) and the MAC address for router 560 because the packet must pass through router 560 on its path to network hardware device 550. The data packet is then sent out of the port of router 560 connected to Ethernet LAN 502 and the packet is received at the destination, network hardware device 550.

Figure 9:
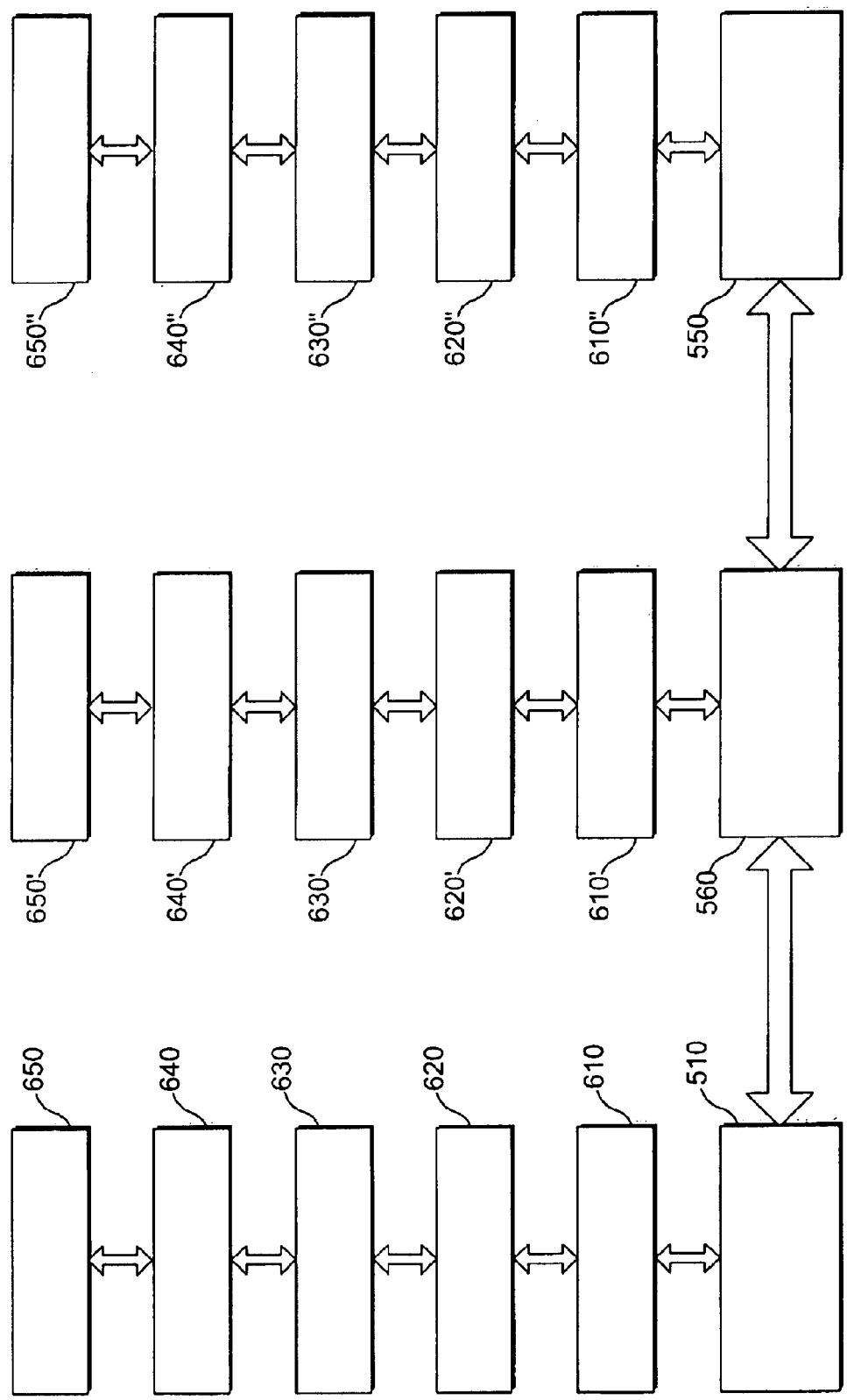
FIG. 9 shows a block diagram of an exemplary data packet transfer between network devices according to the present invention.

FIG. 9 shows a block diagram, similar to FIG. 4, of the exemplary data packet transfer between network devices 510 and 550, as described above, according to the present invention. Each of network hardware devices 510, 550 and 560 are shown having multiple protocol layers 610–650. For example, router 560 has hardware device driver 610', enhanced network driver 620', IP layer 630', TCP layer 640' and application layer 650'. Once again, those skilled in the art will understand that there may be other layers and the layers selected for FIG. 9 are only exemplary. Application layer 650 of network hardware device 510 may, for example, encode information into a data packet and pass this data packet to TCP layer 640 which encapsulates the information in the data packet added by application layer 650 and adds additional TCP layer 640 information. The data packet is then passed to IP layer 630 which encapsulates all the information passed down from TCP layer 640 and adds additional IP layer 630 information, for example the destination IP address of network hardware device 550 and MAC address of router 560. The data packet is then passed down to enhanced network driver 620 which, once again, encapsulates the information passed down from IP layer 630 and also may add, for example, the source IP address and perform a look up of the destination IP addresses. The data packet is then passed to hardware device driver layer 610 which passes the data packet to network hardware device 510 for physical transmission.

When router 560 receives the data packet, it is initially passed up to hardware device driver 610' which de-encapsulates the data added by its peer layer in network hardware device 510, hardware device driver 610, and passes the remaining data up to enhanced network driver 620'. At this point, enhanced network driver 620' may determine the port identification and source MAC address of the data packet and enter this information into, for example, its look-up table for future use. Enhanced network driver 620' may also look up the destination MAC address in, for example, a look-up table so that the data packet may be routed out the correct port of router 560, i.e., the port connected to Ethernet LAN 502. The data packet then continues to IP layer 630' so that additional information may be added to route the data packet to the correct final destination. The data packet may then continue up the layers of router 560, if these other layers have information that needs to be added to the data packet, or it may be ready to be passed back down to enhanced network driver 620' and then to network device driver 610' and, finally, to router 560 for physical transmission. When the data packet arrives at network hardware device 550, each of the layers de-encapsulates the information added by its peer layers.

As described above, enhanced network drivers 620 are generic packet interfaces between the underlying hardware interfaces, hardware device drivers 610, and the upper level layers and applications. Therefore, each of enhanced network drivers 620 are the same for all network hardware devices 510, 550 and 560. Hardware device drivers 610 may be specific to the particular hardware device it is controlling or it may be a generic hardware device driver provided with the network software. For example, hardware device driver 610' for router 560 may have been developed by the manufacturer of router 560 to most efficiently use all the capabilities of router 560. On the other hand, hardware device driver 610' may be a generic hardware device driver provided with the network software. In either case, it does not effect the enhanced network driver 620', a control interface (not shown), or the upper level layers because these modules are generic and independent of the hardware device drivers. Thus, at a later time, the network administrator may install a hardware device driver that is specific to router 560 without making any adjustments to enhanced network driver 620' or the control interface (not shown). Similarly, a new network device may be easily installed because the enhanced network driver and control interface are transportable to any type of device.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A software package for operating on a network including a plurality of network hardware devices, comprising:
    at least one networking protocol to transmit and receive data packets over the network;
    a hardware device driver communicatively coupled to a first network hardware device;
    an enhanced network driver communicatively coupled to the hardware device driver to transmit and receive the data packets using the first network hardware device; and
    a control interface to transmit and receive control information to and from the hardware device driver;
    at least one of the enhanced network driver and control interface being separately portable from the other one of the enhanced network driver and control interface to a second network hardware device.

2. The software package of claim 1, further comprising at least one network application for controlling at least one of the first and second network hardware devices.

3. The software package of claim 2, wherein the at least one network application includes at least one of a web browser and a web server.

4. The software package of claim 2, wherein the control interface includes an interface for communicating the control information between the hardware device driver and the at least one network application.

5. The software package of claim 1, wherein the at least one networking protocol inserts a destination network address in each data packet being prepared for transmission and the enhanced network driver inserts a source network address in each data packet being prepared for transmission.

6. The software package of claim 1 wherein the hardware device driver initializes the first and second of hardware devices.

7. The software package of claim 6, wherein the initialization includes one of setting of hardware device control registers and setting hardware interrupts.

8. The software package of claim 1, wherein the enhanced network driver includes an interface for communicating the data packets between the hardware device driver and the at least one networking protocol.

9. The software package of claim 1, wherein the hardware device driver includes an interface for communicating the data packets between one of the first and second network hardware devices and the enhanced network driver.

10. The software package of claim 1, wherein the at least one networking protocol includes a TCP/IP protocol suite.

11. The software package of claim 1, wherein the control interface includes an object defining a characteristic of one of the first and second network hardware devices.

12. A software package for operating on a first hardware device connected to a network, comprising:
 a hardware device driver communicatively coupled to the hardware device;
 an enhanced network driver communicatively coupled to the hardware device driver to transmit and receive data packets using the hardware device, wherein the enhanced network driver prepares the data packets for transmission by inserting a source network address of the hardware device into the data packets and passes the data packets to the hardware device driver.

13. The software package of claim 12, wherein the software package operates on a second hardware device connected to the network, the enhanced network driver being transportable from the first hardware device to the second hardware device.

14. The software package of claim 12, wherein the enhanced network driver remains unchanged when the first hardware device driver is replaced with a second hardware device driver.

15. The software package of claim 12, wherein the data packets for transmission include a destination network address and the enhanced network driver correlates the destination network address with a port of the first hardware device.

16. The software package of claim 15, wherein the enhanced network driver includes a look-up table for correlating the destination network address with the port of the first hardware device.

17. The software package of claim 15, wherein the enhanced network driver inserts the port information in the data packet when it correlates the destination network address with the port.

18. The software package of claim 12, further comprising a control interface to transmit and receive control information to and from the hardware device driver.

19. A network system, comprising:
 a hardware device driver communicatively coupled to a network hardware devices;
 an enhanced network driver communicatively coupled to the hardware device driver to transmit and receive the data packets between the enhanced network driver and the hardware device driver, the enhanced network driver including a look-up table which includes addressing information corresponding to an address in the data packets;
 at least one networking protocol communicatively coupled to the enhanced network driver; and
 a control interface to transmit and receive control information to and from the hardware device driver, at least one of the enhanced network driver and control interface being separately portable from the other one of the enhanced network driver and control interface.

20. The network system of claim 19, wherein, when the network hardware device receives data packets, the data packets are first passed to the hardware device driver and then passed by the hardware device driver to the enhanced network driver.

21. The network system of claim 19, wherein the network hardware device is assigned a network address and data packets communicated to the network hardware device include the network address.

22. The network system of claim 19, further comprising at least one network application for controlling the network hardware devices.

23. The network system of claim 19, wherein the at least one networking protocol includes a TCP/IP protocol suite.

24. The network system of claim 22, wherein the control interface includes an interface for communicating the control information between the hardware device driver and the at least one network application.

25. The network system of claim 19, wherein the network hardware device is a router.

26. The network system of claim 19, wherein the network hardware device is a network switch.

27. The network system of claim 19, wherein the network hardware device is a network interface card.

28. The network system of claim 19, wherein the network hardware device is an internet appliance.

29. The network system of claim 19, wherein the network hardware device is a personal computer.

30. A network system facilitating communication between a plurality of hardware devices, comprising:
 an upper level module for processing data packets and control information;
 a hardware driver module controlling a corresponding one of the hardware devices;
 an enhanced network driver module providing an interface for transferring data packets between the upper level module and the hardware driver; and
 a control interface module providing an interface for transferring control information between the upper level module and the hardware driver.

31. The system of claim 30, wherein the enhanced network driver module provides addressing information for the data packets.

32. A method for processing by network software data transmitted on a network, the network including a plurality of interconnected hardware devices, the method comprising the steps of:
 receiving by a hardware driver corresponding to a first one of the hardware devices a data packet transmitted over the network;
 passing the data packet from the hardware driver to a generic enhanced network driver module of the network software;
 the generic enhanced network driver extracting addressing data from the data packet and passing the data packet to an upper level module of the network software, wherein control information is passed from the hardware driver to the upper level module via a control interface which is separate from the generic enhanced network driver.

* * * * *

UNITED STATES PATENT AND TRADEMARK OFFICE
CERTIFICATE OF CORRECTION

PATENT NO. : 6,738,829 B1
DATED : May 18, 2004
INVENTOR(S) : Wiles et al.

It is certified that error appears in the above-identified patent and that said Letters Patent is hereby corrected as shown below:

Column 13,
Lines 19-29, please amend claim 12 to include the underline portion:
-- 12. A software package for operating on a first hardware device connected to a network, comprising:
    a hardware device driver communicatively coupled to the hardware device;
    an enhanced network driver communicatively coupled to the hardware device driver to transmit and receive data packets using the hardware device, wherein the enhanced network driver prepares the data packet for transmission by inserting a source network address of the hardware device into the data packets and passes the data packets to the hardware device driver; and a control interface to transmit and receive control information to and from the hardware device driver;
    At least one of the enhanced network driver and control interface being separately portable from the other one of the enhanced network driver and control interface to a second network hardware device. --

Signed and Sealed this

Third Day of August, 2004

JON W. DUDAS
*Acting Director of the United States Patent and Trademark Office*